United States Patent [19]
Boothroyd et al.

[11] Patent Number: 5,080,466
[45] Date of Patent: Jan. 14, 1992

[54] INTERFEROMETER

[75] Inventors: Simon A. Boothroyd, Ottawa, Ontario; Jacek Chrostowski, Gloucester, Ontario, both of Canada

[73] Assignee: National Research Council Canada, Ottawa, Canada

[21] Appl. No.: 490,355

[22] Filed: Mar. 8, 1990

[51] Int. Cl.$^5$ .................................. G02G 27/10
[52] U.S. Cl. .................................. 359/577; 356/345
[58] Field of Search .................. 350/163, 1.1; 356/345, 356/35.5, 360

[56] References Cited

U.S. PATENT DOCUMENTS 4,280,764  7/1981  Sica, Jr. et al.
4,718,749  1/1988  Chiou et al. .................. 350/163
4,768,846  9/1988  Connors ........................ 350/1.1

OTHER PUBLICATIONS

Gower, Malcolm C. entitled "Phase Conjugate Mirrors"—published in Phys. Bull. 38 pp. 220–222 (1987).
Ewbank, M. D. et al., entitled "Phase-Conjugate Interferometry" published in SPIE, vol. 464 (1984), pp. 2–6.
Chiou, Arthur E., et al. entitled "Parallel Image Subtraction Using A Phase-Conjugate Michelson Interferometer"—published in Optic Letters, vol. 11, No. 5, May 1986, pp. 306–308.
Kwong, Sze-Keung, et al. entitled "Real Time Image Subtraction and Exclusive or Operation Using A Self Subtraction and Exclusive Or Operation Using A Self Pumped Phase Conjugate Mirror"—published in Applied Physics Letters 43(3), 20 Jan. 1986, pp. 201–203.
McMichael, Ian et al., entitled "Absolute Phase Shift Of Phase Conjugators"—published in Nonlinear Optics and Applications (1986) vol. 613, pp. 32–35.
McMichael, Ian, et al.—entitled "Phase Shifts Of Photorefractive Gratings and Phase-Conjugate Waves"—Optics Letters/ vol. 12, No. 1/ Jan. 1987.
Vainor, N. A. et al. entitled "Real-Time Parallel Optical Logic In Photorefractive Bismuth Silicon Oxide" Optics Letters/ Jun. 1988/ vol. 13, No. 6, Primary Examiner—Mark Hellner

[57] ABSTRACT

In a Michelson inteferometer with phase conjugate mirrors at least one of such mirrors includes a Kerr medium. This enables control over the relative phases of the beams that are reflected from the mirrors and superimposed to form an output beam. The interferometer can be used to perform a logic function by interposing transparencies in the reflected beams. By appropriate choice of the relative phases a logic OR function can be achieved.

9 Claims, 2 Drawing Sheets

INTERFEROMETER

FIELD OF THE INVENTION

This invention relates to an optical interferometer, and especially an interferometer for data processing.

PRIOR ART

The use of a Michelson interferometer including a laser light source, a beam splitter, two mirrors and a detector is well known. In recent years this interferometer arrangement has been implemented using phase conjugate mirrors in place of the conventional mirrors of the traditional Michelson interferometer. Phase conjugate mirrors reverse both light direction and phase, in that the reflected wave is the complex conjugate of the incident wave. These mirrors produce consistent results which are relatively insensitive to variations in their distances from the source. Additionally, these mirrors insure that the reflected beam travels the same path as its incident a beam. See "Phase Conjugate Mirrors" by Malcolm C. Gower published in Phys.Bull.38 pp.220-222 (1987) and "Phase-Conjugate Interferometry" by M. D. Ewbank et al, published in SPIE, Vol. 464 (1984), pp.2-6.

The extension of the use of Michelson interferometers into the field of data processing is also known. In the articles "Parallel image subtraction using a phase-conjugate Michelson interferometer" by Arthur E. Chiou and Pochi Yeh published in Optic Letters, Vol. 11, No.5, May 1986, pp. 306-308, and "Real time image subtraction and 'exclusive or' operation using a self subtraction and 'exclusive or' operation using a self pumped phase conjugate mirror" by Sze-Keung Kwong, George A. Rakuljic, and Amnon Yariv, published in Applied Physics Letters 43(3), 20 January 1986, pp. 201-203, image subtraction is discussed in detail. Image subtraction, which in terms of Boolean algebra is the "exclusive or" (XOR) function, is performed using a phase conjugate Michelson interferometer having transparencies in the beam paths to provide the input, and a light detector at the output. It is the phase reversal of the beams upon reflection from the phase conjugate mirrors and the use of a dielectric beam splitter that allow this XOR function to be performed.

SUMMARY OF THE INVENTION

An object of the present invention is to provide an interferometer that is capable of being used to perform a logic function and particularly the OR function.

To this end, the invention consists of an interferometer comprising: a laser light source for providing an initial beam of laser light, a dielectric beam splitter for splitting said initial beam into a first and second incident beam, a first phase conjugate mirror for reflecting said first incident beam, thereby providing a first reflected beam having a first phase angle, a second phase conjugate mirror for reflecting said second incident beam, thereby providing a second reflected beam having a second phase angle, means for directing said first and second reflected beams to said beam splitter to be superimposed on each other to generate an output beam, and a detector for receiving said output beam, wherein at least one of said mirrors includes a pumped Kerr medium characterized by an equation $n = n_0 + n_2 I$, where n is the local refractive index of the medium, $n_0$ is the linear refractive index of the medium, $n_2$ is the nonlinear refractive index of the medium and I is the light intensity, said nonlinear refractive index of the medium being characterized by $n_2 = n_2' + i n_2''$, where $n_2'$ is the dispersive component and $n_2''$ is the absorptive component, and the value of the phase angle imparted to its reflected beam by the mirror embodying the Kerr medium being equal to $\tan^{-1}(-n_2'/n_2'')$ whereby to enable said first and second phase angles to be different from each other.

More specifically, the interferometer may include first and second transparencies in the paths of the respective reflected beams so that the output beam takes the form of an interference pattern determined by $$I_{out} = R_{T1}^2 + R_{T2}^2 + 2R_{T1}R_{T2}\cos\theta$$

where $I_{out}$ a nary value representing intensity detected in a region of said interference pattern, where $R_{T1}$ is a binary value equal to zero for an opaque region of said first transparency and equal to one for a transparent region of said first transparency, where $R_{T2}$ is a binary value equal to zero for an opaque region of said second transparency and equal to one for a transparent region of said second transparency, and where $\theta = \phi_1 - \phi_2 + \pi$, and $\phi_1$ is said first phase angle and $\phi_2$ is said second phase angle.

To achieve the OR function the Kerr medium or media should be so chosen or modified that $\phi_1$ and $\phi_2$ are such that $\theta = 2\pi/3$.

DETAILED DESCRIPTION OF THE PREFERRED EMBODIMENT

Figure 1:
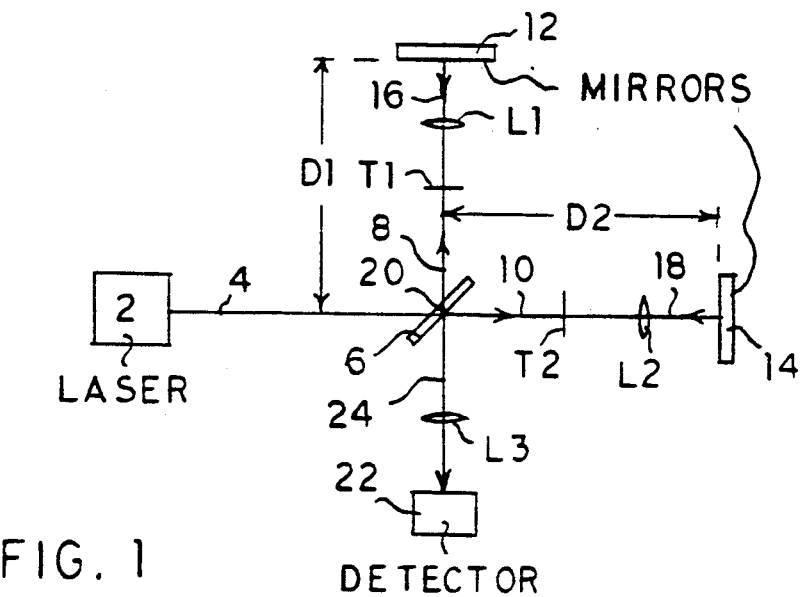
FIG. 1 shows a conventional Michelson interferometer.

FIG. 1 shows a conventional Michelson interferometer. In this device, a laser light source 2 directs an incident laser beam 4 onto a point 20 on a dielectric beam splitter 6, which splits the beam into two incident beams 8 and 10. The beam splitter has two air/dielectric interfaces. As is usual in the implementation of a Michelson interferometer one interface is non-reflecting as a result of anti-reflection coatings or angled so as not to direct light toward mirror 12. The appropriate action of the beam splitter thus occurs at one interface only. The incident beam 4 first encounters the non-reflecting interface of beam splitter 6 followed by the second interface at which reflection produces beam 8 and transmission leads to beam 10. The point at which this reflection occurs is point 20 on beam splitter 6 in FIG. 1. For the time being, transparencies T1 and T2, situated in the paths of beams 8 and 10 respectively, are ignored. These incident beams 8 and 10 are then reflected by a pair of conventional mirrors 12 and 14, respectively. The mirrors 12 and 14 are spaced at distances of D1 and D2, respectively, from the beam splitter 6. Each beam undergoes a phase shift of $\pi$ radians at the mirrors 12 and 14, as is typical when light reflects off a dielectric mirror. The phase shift occurring on reflection from these identical mirrors is the same for both beams 8 and 10. Any relative difference in phase between beams 16 and 18 at these mirrors is a result of beams 8 and 10 having travelled over different optical paths from point 20 of beam splitter 6. Reflected beams 16 and 18, travelling the same path but in opposite directions to the respective incident beams 8 and 10, then return to the beam splitter 6 at the point 20. Reflected beam 16 continues through the beam splitter 6 toward a light intensity detector 22. Beam 18, however, is deflected by the beam splitter 6 in order that its direction change in such a way as to direct it toward the detector 22. This deflection imparts a $\pi$ phase shift to beam 18, after which time the beam is superimposed on the reflected beam 16. Following beam splitter 6, the optical paths which beams 16 and 18 take as beam 24 are identical. The resulting interference pattern 24 is now detected by the detector 22.

When the interferometer is correctly aligned the intensity of the light measured by detector 22 depends on the value, to within one wavelength, of the phase difference between beams 16 and 18 and on the amplitude of each of the two light beams. Beams 16 and 18 both have the same state of polarization as the incident beam 4. Beam splitter 6 acts to divide the amplitude of the incident beam 4 between beams 8 and 10. In order to have destructive interference between beams 16 and 18 at 24 the relative phase difference between beams 16 and 18 as they combine to form beam 24 must be $\pi$. In order to achieve this condition the distances D1 and D2 have to be precisely controlled and held steady to a relative path difference of $n\lambda/2$ where n is a positive integer (including zero) and $\lambda$ is the wavelength. Complete destructive interference will be observed at 24 when beams 16 and 18 have the same intensity. However, as such systems are subject to air currents, temperature changes and the like, and since light related experimental apparatus requires high precision, the effort to accurately calculate and maintain such precise dimensions makes the use of conventional mirrors highly impractical.

For this reason, it has become standard in the interferometer art to use phase conjugate mirrors comprised of a photorefractive material. It is well known that the use of such mirrors in a Michelson interferometer insures that the beams 16 and 18 have precisely the same phase as each other upon returning to the point 20 at the beam splitter 6. A relative phase shift of $\pi$ is introduced between beams 16 and 18 because beam 18 is reflected from the dielectric beam splitter with a $\pi$ phase change. Thus beams 16 and 18 interfere destructively to form beam 24. A Michelson interferometer using phase conjugate mirrors is self-compensating for changes in arm lengths D1 and D2 and other ambient factors, and hence valid results can be obtained much more consistently than with standard mirrors. Furthermore, reflection from a phase conjugate mirror imparts a phase change $\phi$ to the reflected beam, which depends on the phase conjugate mirror. When this phase can be controlled independently for each of the phase conjugate mirrors, an arbitrary relative phase difference between beams 16 and 18 at beam splitter 6 can be arranged, leading, for example, to an interferometer biased at the operating point of highest sensitivity and linear response.

The usefulness of such an interferometer can extend to the area of data processing. Specifically, if we now consider the transparencies T1 and T2, the function "exclusive or" (XOR), can be implemented as will be described. For convenience, the logic table for the XOR function is now reproduced for a system having binary inputs X and Y, and corresponding output Z.

| X | Y | Z |
|---|---|---|
| 0 | 0 | 0 |
| 0 | 1 | 1 |
| 1 | 0 | 1 |
| 1 | 1 | 0 |

Figure 2:
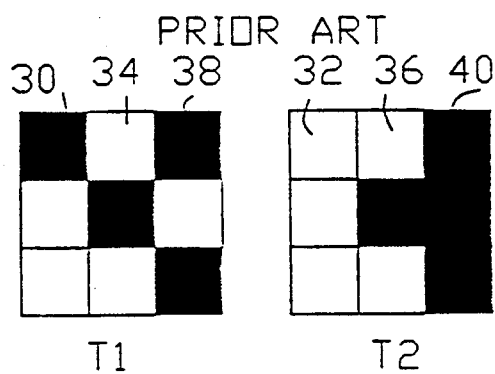
FIG. 2 shows examples of input transparencies for the interferometer.

Transparency T1 is situated in the path of the beam 8, and, of course, in the path of the corresponding reflected beam 16. Similarly, transparency T2 is situated in the path of the beam 10 and its reflected beam 18. Examples of transparencies T1 and T2 that could be used in the interferometer of FIG. 1 are shown in FIG. 2. In addition, as shown in FIG. 1 and well known in the art three imaging lenses L1-L3 are required to form correctly sized and focused images of the transparencies at the detector 22 which will consist of an array of detector elements corresponding to the pixel arrays in the transparencies.

For each transparency, the shaded areas shown in FIG. 2, such as regions 30, 38 and 40, represent regions opaque to light, and are given the binary value 0, while the unshaded areas, such as regions 34, 32 and 36, represent regions transparent to light and are given the binary value 1.

It is noted that in FIG. 1 the transparencies are drawn at an exaggerated size, relative to the beam width. In practice, the array of opaque and transparent regions must be sized in order to fit within the area of the beam directed thereat.

Figure 3:
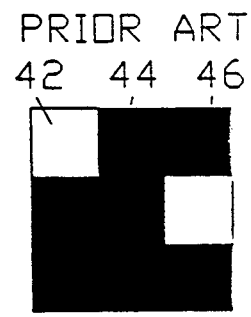
FIG. 3 shows the output of the XOR function for the input transparencies of FIG. 2.

Given T1 and T2 as in FIG. 2, the output of the Michelson interferometer of FIG. 1 in which mirrors 12 and 14 are identical phase conjugators, as detected by the detector 22, would be as is shown in FIG. 3. That is, the output is that of an XOR function, given that the unshaded and shaded regions correspond to regions where light is and is not detected, respectively, by the detector 22.

With symbols $R_{T1}$ and $R_{T2}$ representing the amplitude transmittance of a particular region of the transparencies T1 and T2 respectively, and being assigned a binary value of 0 or 1, the light intensity $I_{out}$ detected by the detector 22 can be determined by the following equation.

$$I_{out} = R_{T1}^2 + R_{T2}^2 + 2R_{T1}R_{T2} \cos \theta \qquad (1)$$

The symbol $\theta$ represents the relative phase difference between the reflected beams 16 and 18 after leaving the beam splitter 6 and producing the interference pattern 24, i.e. $\theta = \phi_1 - \phi_2 + \pi$ at the detector 22, where $\phi_1$ and $\phi_2$ are the respective phase angles of the reflected beams 16 and 18 received at the beam splitter 6, the term $\pi$ being imparted by the reflection of the beam 18 at the beam splitter 6. If identical phase conjugate mirrors are used, $\phi_1 = \phi_2$, and hence $\theta = \pi$ and $\cos \theta = -1$ at the detector 22.

For example, the region 34 of T1 corresponds to the region 36 of T2, both in FIG. 2. Since both of these regions are transparent $R_{T1} = R_{T2} = 1$, and hence $I_{out}=0$, resulting in the corresponding output region 44 of FIG. 3 being dark. This result is dictated by the fact that the reflected beams 16 and 18 of FIG. 1 have equal amplitude and interfere destructively with each other, and no light will appear at the detector 22 in this region.

Consider now an opaque region 30 of T1, in FIG. 2, i.e. $R_{T1}=0$, and a corresponding transparent region 32 of T2, i.e. $R_{T2}=1$, then $I_{out}=1$ and light is detected at the corresponding output, i.e. region 42 of FIG. 3 is unshaded. This is because the portion of the beam 8 attempting to pass through the transparency T1 in its opaque region 30 is blocked. Conversely, the beams 10 and 18 successfully pass through the corresponding transparent region 32 of the transparency T2. As a result, this portion of the beam 18 has no corresponding beam portion 16 to interfere with and is simply detected by the detector 22 as a light beam.

Finally, consider the situation where both the corresponding regions of the transparencies T1 and T2 are opaque, such as regions 38 and 40, i.e. $R_{T1}=R_{T2}=0$, resulting in $I_{out}=0$. Clearly both beam portions corresponding to these regions are blocked, and the corresponding output region detected by the detector is without light. Thus the XOR function is realized.

The usefulness of this system for data processing is obvious. The transparencies used can easily contain as many as $10^6$ regions, i.e. a megabit of information, and will each be comprised of an electronically addressable array of pixels, known in the art as a spatial light modulator. Thus it is possible to perform a million operations in parallel, greatly increasing computational speed, as opposed to conventional data processors which generally process data serially. A drawback, however, is that the Michelson interferometer using identical phase conjugate mirrors can only realize the XOR function as above. This is due to the property of the phase conjugate mirrors which insure that the relative phase difference between beams 16 and 18 is zero as they are incident on beam splitter 6 at point 20.

This difficulty is overcome by the invention which enables the angle $\theta$ to be altered by making $\phi_1$ and $\phi_2$ unequal to each other, thus altering the results obtained from equation 1, and generating a further logic function. Specifically, if $\theta=2\pi/3$ then $\cos\theta=-\frac{1}{2}$ and equation (1) simplifies to $$I_{out}=R_{T1}^2+R_{T2}^2-R_{T1}R_{T2} \qquad (2).$$

which, for binary values of $R_{T1}$ and $R_{T2}$, simulates the OR function. For convenience, the logic table for the OR function is now reproduced for a system having binary inputs X and Y, and corresponding output Z.

| X | Y | Z |
|---|---|---|
| 0 | 0 | 0 |
| 0 | 1 | 1 |
| 1 | 0 | 1 |
| 1 | 1 | 1 |

Figure 4:
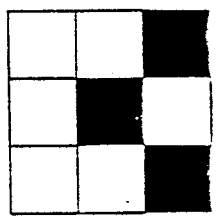
FIG. 4 shows the output of the OR function for the input transparencies of FIG. 2, obtained by means of the present invention.

This result is demonstrated graphically in FIG. 4.

Such an alteration of $\theta$ can be achieved through the use of a Kerr medium as the reflecting material in the phase conjugate mirrors 12 and 14 of FIG. 1. A Kerr medium is characterized by an equation $$n=n_0+n_2 I \qquad (3).$$

This known equation relates the local refractive index n, to the linear refractive index $n_0$, the nonlinear refractive index $n_2$ and the local light intensity I at a point of interest. The nonlinear refractive index $n_2$ is complex, i.e. has a real and an imaginary component, in an absorptive medium—characterized by the equation $$n_2=n_2'+in_2'' \qquad (4).$$

where $n_2'$ is the dispersive component, $n_2''$ is the absorptive component and i signifies the imaginary term.

It is only when $n_2$ is not equal to zero that the material is a Kerr medium. A Kerr medium can be totally non-absorptive, totally absorptive or a combination thereof. A Kerr medium is totally non-absorptive, sometimes known as a pure Kerr medium, when the imaginary component $n_2''$ is equal to zero, resulting in $n_2$ being real. When $n_2''$ is not equal to zero, the medium is sometimes known as an absorptive Kerr medium. A Kerr medium is totally absorptive when the real component $n_2'$ is equal to zero, resulting in $n_2$ being imaginary.

For the purpose of this specification, the term "Kerr medium" is used to encompass all materials that exhibit the characterizing equations (3) and (4) discussed above with n, $n_0$ and $n_2$ never equal to zero, but with the possibility that $n_2'$ or $n_2''$ (but not both) may be equal to zero.

Some examples of absorptive Kerr media are:
  i) acridine orange doped fluorophosphate glass
  ii) fluorescein doped boric acid glass
  iii) ruby.

Figure 5:
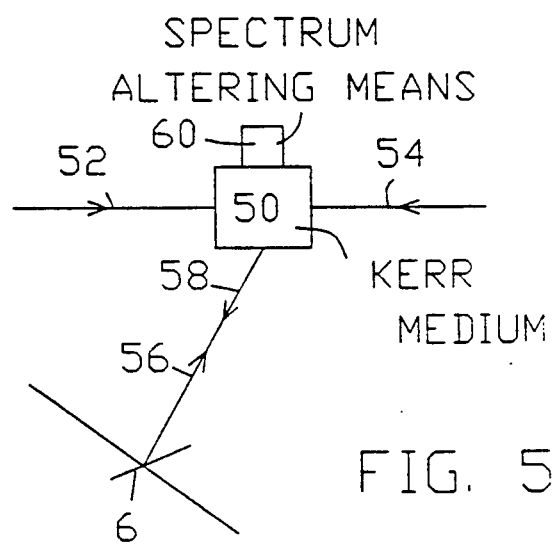
FIG. 5 shows laser light reflecting off a pumped Kerr medium.

Referring now to FIG. 5, a Kerr medium 50 is subjected to two strong counter-propagating pump beams 52 and 54 as well as a probe beam 56 at an arbitrary angle to the medium. The nature of the pump beams will be as explained in the literature references referred to above, all the beams having been derived from the same laser source as all the other beams in the interferometer and being mutually coherent at the Kerr medium. Furthermore the two pump beams are phase conjugate to each other.

In the system of FIG. 1, the medium 50 would correspond to one or both of the mirrors 12 and 14, and the probe beam 56 would correspond to one or both of the incident beams 8 and 10. Each of the pump beams 52 and 54 forms a stationary intensity variation with the probe beam 56 due to interference where they overlap in medium 50. This leads to index gratings in the Kerr medium 50 as a consequence of equation (3). Light from each pump beam is diffracted off these gratings to produce a phase conjugate beam 58, which travels in the opposite direction to the probe beam 56. This arrangement of Kerr medium, overlapping pump and probe beams may be referred to as a "phase conjugate mirror". The probe beam 56 incident upon this "mirror" is reflected exactly back along its incident direction and undergoes a phase change of $\phi$ on reflection from the mirror. Thus the probe beam 56 is effectively reflected off the Kerr medium and given an extra phase shift of $\phi$ at the point at which it returns as beam 58 to the beam splitter 6.

Using two pumped Kerr media in the system of FIG. 1, i.e. one in each of the mirrors 12 and 14, the phase angles imparted to the reflected beams 16 and 18, i.e. $\phi_1$ and $\phi_2$, can be made to be different from each other by selecting different Kerr media having different dispersive and absorptive components, i.e. appropriate $n_2'$ and $n_2''$ values, for the respective mirrors. Specifically, the values should be selected so that the equation $$\phi = \tan^{-1}(-n_2'/n_2'') \tag{5}$$

provides the desired value for each of $\phi_1$ and $\phi_2$.

In particular, for the system of FIG. 1 to perform an OR function, $\theta$ must be equal to $2\pi/3$ radians, as discussed above in conjunction with equation (2). Since $\theta = \phi_1 - \phi_2 + \pi$ the mirrors must be such that $\phi_2 - \phi_1 = \pi/3$.

This can be achieved by the use of two different Kerr media each with appropriate values of $n_2'$ and $n_2''$.

It is not essential that a pumped Kerr medium be used in both the mirrors 12 and 14, provided such a medium is used in one of them. Specifically, if mirror 12 is a standard dielectric mirror, then $\phi_1 = \pi$. Thus, in order to perform the OR function, mirror 14 must be a pumped Kerr medium providing $\phi_2 = 4\pi/3$, since $\phi_2 - \phi_1 = \pi/3$.

Moreover, whether one or two pumped Kerr media are used, the absorption spectrum, and thus the values of $n_2'$ and $n_2''$, for each Kerr medium can be altered by a choice of: temperature, pressure, an applied electric, magnetic, or electromagnetic field, either direct or alternating, by the influence of a third beam of laser light, or by a chemical reaction. Thus a spectrum altering means 60 to apply one of these variables can be provided adjacent the Kerr medium 50 as shown in FIG. 5.

Furthermore the ability to control the phase shifts $\phi_1$ and $\phi_2$ as described above enables metal-dielectric or lossy beam splitters, for which the phase change on reflection is in general different to $\pi$, to be used as the beam splitter 6 while still allowing both the OR or XOR functions to be realized.

The use of absorptive Kerr media, e.g. ruby, as phase conjugators is disclosed by Ian McMichael, Pochi Yeh and Monte Khoshnevisan in "Absolute Phase Shift of Phase Conjugators" published in Nonlinear Optics and Applications (1986) Vol. 613, pp. 32-35. This reference discusses the theory and experimental measurement of phase shifts imparted to light beams by various types of phase conjugators. An experimental apparatus is used which includes an interferometer. The various types of phase conjugators tested, however, are not used in the mirrors of the interferometer as in the present invention, but are disposed in the beam paths in order to obtain measurements of the phase shifts imparted by these phase conjugators. This reference does not discuss equation (5) above, and also does not include or even imply the use of such an equation in conjunction with apparatus used to execute Boolean functions. Neither the theory nor the experimental results disclose the significance of imparting phase shifts to beams of light in an interferometer, and particularly to phase shifts such that $\theta = 2\pi/3$, i.e. $\phi_2 - \phi_1 = \pi/3$ so that the OR function can be executed.

As indicated above, in addition to having the phase difference between the beams 16 and 18 known and controllable, their intensities must be equal or at least close together. To equalize the intensities of these beams it may be necessary in practice to include an attenuator in one arm of the interferometer. This can be achieved by modifying one of the spatial light modulators (transparencies) or by changing the reflectivity of one of the phase conjugate mirrors to modify the percentage of light it reflects. This latter change can be achieved by modifying the intensity of the pump beams.

Figure 6:
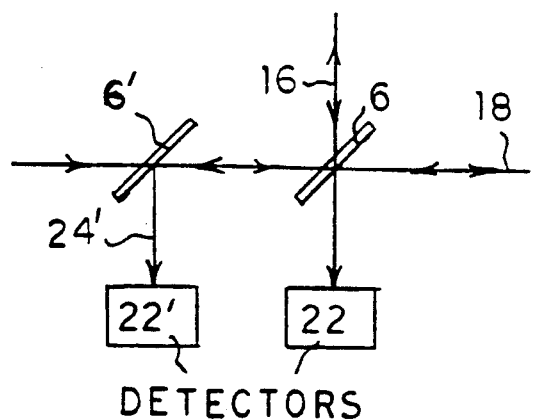
FIG. 6 shows a fragmentary view of an alternative.

While the specific example of FIGS. 1-5 relates to the achievement of the OR function, the present invention is not so limited. For example, as shown in FIG. 6, if a second dielectric beam splitter 6' is introduced into the incoming beam 4, an AND function can be achieved. In this case, the beams 16 and 18 reflected as a beam 24' from the second beam splitter 6' into a second detector 22' will have no relative phase shift added by the beam splitter 6' as happened at the main beam splitter 6 on the way to the detector 22. As a result, whereas the OR function is seen at detector 22, at detector 22' the relative phase difference between the beams is $\pi/3$ or $\cos\theta = 0.5$. Hence the truth table at detector 22' is:

| X | Y | Z | AND |
|---|---|---|-----|
| 1 | 1 | 3 | 1 |
| 1 | 0 | 1 | 0 |
| 0 | 1 | 1 | 0 |
| 0 | 0 | 0 | 0 |

By setting the detector 22' to have such a threshold that any signal below an intensity of say about 1.5 is recorded as a 0, the result is an AND function as shown in the fourth column.

The present invention is useful even without the use of the input transparencies. By selecting $\theta = \pi/3$, light is received at the detector 22 of the interferometer when neither of the beam 8 or 10 is interrupted, unlike the prior art interferometer in which the beams interfere destructively when the beams are uninterrupted. Any type of two beam optical detection system, e.g. an alarm system, in which it is desired to notify an operator when both beams are interrupted could make use of this invention.

We claim:

1. An interferometer comprising:
    a laser light source for providing an initial beam of laser light,
    a dielectric beam splitter for splitting said initial beam into a first and second incident beam,
    a first phase conjugate mirror for reflecting said first incident beam, thereby providing a first reflected beam having a first phase angle,
    a second phase conjugate mirror for reflecting said second incident beam, thereby providing a second reflected beam having a second phase angle,
    means for directing said first and second reflected beams to said beam splitter to be superimposed on each other to generate an output beam, and
    a detector for receiving said output beam,
    wherein at least one of said mirrors includes a pumped Kerr medium characterized by an equation $n = n_0 + n_2 I$, where n is the local refractive index of the medium, $n_0$ is the linear refractive index of the medium, $n_2$ is the nonlinear refractive index of the medium and I is the light intensity, said nonlinear refractive index of the medium being characterized by $n_2 = n_2' + i n_2''$, where $n_2'$ is the dispersive component and $n_2''$ is the absorptive component, and the value of the phase angle imparted to its reflected beam by the mirror embodying the Kerr medium being equal to $\tan^{-1}(-n_2'/n_2'')$, said mirrors being such that said first and second phase angles are different from each other.

2. The interferometer according to claim 1, including a first and a second data input means in the path of said first and second reflected beams respectively.

3. The interferometer according to claim 2, wherein said first and second data input means respectively comprise a first and a second transparency, said output beam being in the form of an interference pattern determined by $$I_{out} = R_{T1}^2 + R_{T2}^2 + 2R_{T1}R_{T2} \cos \theta,$$

where $I_{out}$ is a binary value representing intensity detected in a region of said interference pattern, where $R_{T1}$ is a binary value equal to zero for an opaque region of said first transparency and equal to one for a transparent region of said first transparency, where $R_{T2}$ is a binary value equal to zero for an opaque region of said second transparency and equal to one for a transparent region of said second transparency, and where $\theta = \phi_1 - \phi_2 + \pi$, and $\phi_1$ is said first phase angle and $\phi_2$ is said second phase angle.

4. The interferometer according to claim 3, wherein the values of $\phi_1$ and $\phi_2$ are such that $\theta = 2\pi/3$ radians whereby said output beam exhibits an OR logic relationship to the first and second transparencies.

5. The interferometer according to claim 1, including means for modifying the value of at least one of $n_2'$ and $n_2''$ whereby to change at least one of said phase angles.

6. The interferometer according to claim 5, wherein said modifying means comprises means for varying the temperature, pressure, or electric, magnetic or electromagnetic field either direct or alternating, applied to said Kerr medium.

7. The interferometer according to claim 5, wherein said modifying means comprises means for applying a further beam of laser light to the Kerr medium.

8. An interferometer according to claim 1, wherein the beam splitter is a metal-dielectric or lossy beam splitter.

9. An interferometer according to claim 2, including a second dielectric beam splitter located in the initial beam prior to the primary beam splitter, said second beam splitter being arranged to receive said reflected beams to generate a second output beam directed to a second detector having a threshold such as to exhibit an AND logic relationship to the first and second data input means.

* * * * *